tion No. PCT/US2012/054422 dated Dec. 12, 2012, 11 Pages.

United States Patent
Rahmane et al.

(10) Patent No.: US 9,577,297 B2
(45) Date of Patent: Feb. 21, 2017

(54) ELECTROCHEMICAL CELLS INCLUDING A CONDUCTIVE MATRIX

(71) Applicant: General Electric Company, Schenectady, NY (US)

(72) Inventors: Mohamed Rahmane, Ballston Lake, NY (US); Badri Narayan Ramamurthi, Clifton Park, NY (US); Andrey Meshkov, Niskayuna, NY (US); Richard Louis Hart, Broadalbin, NY (US); Michael Alan Vallance, Albany, NY (US); David Charles Bogdan, Jr., Charlton, NY (US); Chandra Sekher Yerramalli, Mumbai (IN)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 14/797,679

(22) Filed: Jul. 13, 2015

(65) Prior Publication Data
US 2015/0318586 A1   Nov. 5, 2015

Related U.S. Application Data

(63) Continuation-in-part of application No. 13/250,680, filed on Sep. 30, 2011, now abandoned.

(51) Int. Cl.
  *H01M 2/00*   (2006.01)
  *H01M 10/653*   (2014.01)
  (Continued)

(52) U.S. Cl.
  CPC ......... *H01M 10/653* (2015.04); *H01M 2/0252* (2013.01); *H01M 4/381* (2013.01);
  (Continued)

(58) Field of Classification Search
  CPC .. H01M 10/653; H01M 10/654; H01M 10/39; H01M 10/38; H01M 10/399; H01M 4/381; H01M 4/382; H01M 4/582; H01M 4/661; H01M 4/70; H01M 4/626; H01M 4/80; H01M 4/808; H01M 2/0252; H01M 2/1646; H01M 2/18; H01M 2004/027; H01M 2004/028
  See application file for complete search history.

(56) References Cited

U.S. PATENT DOCUMENTS 3,660,888 A   5/1972   Epstein et al.
3,692,585 A   9/1972   Mayo
(Continued)

FOREIGN PATENT DOCUMENTS

DE   19625424 A1   1/1997
EP   0158815 A1   10/1985
JP   63294671 A   12/1988

OTHER PUBLICATIONS

Search Report and Written Opinion from corresponding PCT Application No. PCT/US2012/054422 dated Dec. 12, 2012, 11 Pages.

*Primary Examiner* — Jane Rhee
(74) *Attorney, Agent, or Firm* — Francis T. Coppa (57) ABSTRACT

An electrochemical cell is presented. The cell includes a housing having an interior surface defining a volume, and an elongated separator disposed in the housing volume. The elongated separator defines an axis of the cell. The separator has an inner surface and an outer surface. The inner surface of the separator defines a first compartment. The outer surface of the separator and the interior surface of the housing define a second compartment having a volume. The cell further includes a conductive matrix disposed in at least a portion of the second compartment volume such that the conductive matrix occupies a gap between the outer surface of the separator and the interior surface of the housing. The
(Continued)

gap in the second compartment extends in a direction substantially perpendicular to the axis of the cell.

20 Claims, 10 Drawing Sheets

(51) Int. Cl.
| | |
|---|---|
| *H01M 10/654* | (2014.01) |
| *H01M 4/38* | (2006.01) |
| *H01M 4/58* | (2010.01) |
| *H01M 2/02* | (2006.01) |
| *H01M 10/38* | (2006.01) |
| *H01M 10/39* | (2006.01) |
| *H01M 4/66* | (2006.01) |
| *H01M 4/70* | (2006.01) |
| *H01M 4/02* | (2006.01) |
| *H01M 2/16* | (2006.01) |
| *H01M 2/18* | (2006.01) |
| *H01M 4/62* | (2006.01) |
| *H01M 4/80* | (2006.01) |

(52) U.S. Cl.
 CPC .......... *H01M 4/382* (2013.01); *H01M 4/582* (2013.01); *H01M 4/661* (2013.01); *H01M 4/70* (2013.01); *H01M 10/38* (2013.01); *H01M 10/39* (2013.01); *H01M 10/399* (2013.01); *H01M 10/654* (2015.04); *H01M 2/1646* (2013.01); *H01M 2/18* (2013.01); *H01M 4/626* (2013.01); *H01M 4/80* (2013.01); *H01M 4/808* (2013.01); *H01M 2004/027* (2013.01); *H01M 2004/028* (2013.01); *Y10T 29/49108* (2015.01)

(56) References Cited

U.S. PATENT DOCUMENTS

| | | |
|---|---|---|
| 3,939,007 A | 2/1976 | Sudworth et al. |
| 4,590,136 A | 5/1986 | Buehler et al. |
| 4,910,105 A | 3/1990 | Tilley et al. |
| 5,407,756 A | 4/1995 | Sprouse |
| 5,763,117 A | 6/1998 | Wright et al. |
| 6,007,943 A | 12/1999 | Coetzer |
| 7,659,021 B2 | 2/2010 | Horiuchi et al. |
| 7,722,973 B2 | 5/2010 | Yoshida |
| 2010/0086834 A1 | 4/2010 | Mahalingam et al. |
| 2010/0178546 A1 | 7/2010 | Rijssenbeek et al. |
| 2012/0219843 A1 | 8/2012 | Bogdan, Jr. et al. |

ELECTROCHEMICAL CELLS INCLUDING A CONDUCTIVE MATRIX

CROSS REFERENCE TO RELATED APPLICATIONS

This application is a continuation-in-part of U.S. patent application Ser. No. 13/250,680, entitled "ELECTROCHEMICAL CELLS INCLUDING A CONDUCTIVE MATRIX," filed on 30 Sep. 2011, which is incorporated herein by reference.

BACKGROUND

The present disclosure relates generally to an electrochemical cell. More particularly, the present disclosure relates to a high temperature electrochemical cell including a conductive matrix.

Typical electrochemical cells/batteries include a negative electrode, a positive electrode, and electrolyte materials. High temperature molten salt rechargeable batteries (for example, sodium-metal halide batteries), including a molten metal negative electrode (usually referred to as an anode) and a beta-alumina solid electrolyte in the cells, are of considerable interest for energy storage applications. In addition to the anode, the cells include a positive electrode (usually referred to as a cathode) that supplies/receives electrons during the charge/discharge of the battery. The solid electrolyte is typically placed in a casing to separate an interior space of the cell into an anode and a cathode, and functions as the membrane or "separator" between the anode and the cathode.

Current developments of the sodium-metal chloride batteries are focused on the improvement of the performance and the cycle life. When these batteries are employed in mobile and utility applications, the batteries may be subjected to several charge and discharge cycles. During discharge of these batteries, heat is produced. Most of the heat is generated in the core i.e., the cathode of a cell, due to joule heating and chemical reactions. The cell is typically air-cooled through the external walls of its casing. The fully charged battery typically has an anode only about half full of molten metal (e.g., sodium), thereby leaving an empty space (e.g., an air gap) in the anode. The air gap as well as the molten metal typically does not conduct heat. Thus, the core i.e., the cathode of the cell remains at a higher temperature than the casing due to inefficiencies (ineffective) in transmitting heat from the cathode to the casing. For example, after a few charge/discharge cycles (such as 10 cycles), the temperature at the core of a sodium metal-halide cell is approximately 50 degrees higher than that of the outer casing. Moreover, as the battery discharges, the amount of molten metal in the anode is reduced, which increases the height of air gap. This air gap further limits the thermal cooling ability of the cell/battery, and also increases travel distance for the electrons during discharge (i.e., reduces the electrical conduction between the cathode and the casing).

There continues to be a growing need in the art for an improved solution to the long-standing problem of the performance and the cycle life of the batteries. It may be therefore desirable to develop a cell deign for providing effective thermal and electrical conduction between the core (i.e., cathode) and the casing of the cell.

BRIEF DESCRIPTION OF THE INVENTION

In one embodiment, an electrochemical cell is presented. The cell includes a housing having an interior surface defining a volume, and an elongated separator disposed in the housing volume. The elongated separator defines an axis of the cell. The separator has an inner surface and an outer surface. The inner surface of the separator defines a first compartment. The outer surface of the separator and the interior surface of the housing define a second compartment having a volume. The cell further includes a conductive matrix disposed in at least a portion of the second compartment volume such that the conductive matrix occupies a gap between the outer surface of the separator and the interior surface of the housing. The gap in the second compartment extends in a direction substantially perpendicular to the axis of the cell.

In another embodiment, an electrochemical cell includes a housing having an interior surface defining a volume, and an elongated separator disposed in the volume, defining an axis of the cell. The separator has an inner surface and an outer surface. The inner surface defines a first compartment including a cathode material. The outer surface of the separator and the interior surface of the housing define a second compartment having a volume. The cell includes a conductive thin sheet disposed in the second compartment. The conductive thin sheet substantially conforms to a shape defined by the outer surface of the separator such that a channel is formed between the conductive thin sheet and the outer surface of the separator. A conductive matrix is further disposed in a portion of the second compartment volume such that the conductive matrix occupies a gap between an outer surface of the conductive thin sheet and the interior surface of the housing, wherein the gap extends in a direction substantially perpendicular to the axis of the electrochemical cell. The conductive matrix is in direct contact with both the outer surface of the conductive thin sheet and the interior surface of the housing in a substantially continuous manner.

DETAILED DESCRIPTION OF THE INVENTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value. In the following specification and claims, the singular forms "a", "an" and "the" include plural referents, unless the context clearly dictates otherwise.

As used herein, "cathode" or "cathode material" or "positive electrode material" (which may all be used interchangeably) supplies electrons during charge and is present as part of a redox reaction. "Anode" or "anode material" or "negative electrode material" (which may all be used interchangeably) accepts electrons during charge and is present as part of the redox reaction.

An electrolyte is a medium that provides the ion transport mechanism between the positive and the negative electrodes of a device/cell, and may act as a solvent for the oxidized form of the positive electrode material. Additives that facilitate the primary redox process, but do not themselves provide the primary redox process, are distinguished from the electrolyte itself.

As discussed in detail below, some embodiments of the present disclosure provide an electrochemical cell, for example a high temperature molten salt battery incorporating a conductive matrix. In some embodiments, an electrochemical cell includes a housing having an interior surface defining a volume and an elongated separator disposed in the housing volume. The elongated separator defines an axis of the cell. The separator has an inner surface and an outer surface. The inner surface of the separator defines a first compartment, and the outer surface of the separator and the interior surface of the housing define a second compartment having a volume. A conductive matrix is disposed in at least a portion of the second compartment volume such that the conductive matrix occupies a gap between the outer surface of the separator and the interior surface of the housing, wherein the gap extends in a direction substantially perpendicular to the axis of the electrochemical cell.

The conductive matrix of the present disclosure is configured to occupy all or a portion of the second compartment such that at least one of the thermal or electrical contacts is maintained between the first compartment (i.e., the cell core) and the housing. The conductive matrix disposed in the second compartment, allows for one or more of improved thermal transfer, reduced internal resistance, increased power output, improved separator support, and increased contact area between the separator and the anode material in the cell.

As used herein, the term "high temperature" generally refers to a temperature above 250 degrees Celsius, unless otherwise indicated. The electrochemical cells, as described in some embodiments of the present disclosure, function optimally within a specific range of temperatures. Molten salt batteries operate at temperatures in a range from about 250 degrees Celsius to about 700 degrees Celsius. In some embodiments, the electrochemical cell operates between about 250 degrees Celsius to about 350 degrees Celsius. In some other embodiments, the electrochemical cell operates between about 400 degrees Celsius to about 700 degrees Celsius. For example, the optimal operating temperature of a sodium metal halide (e.g., sodium nickel chloride) battery may be about 300 degrees Celsius. In one embodiment, the temperature of the battery is maintained between about 280 degrees Celsius and 330 degrees Celsius.

Figure 1:
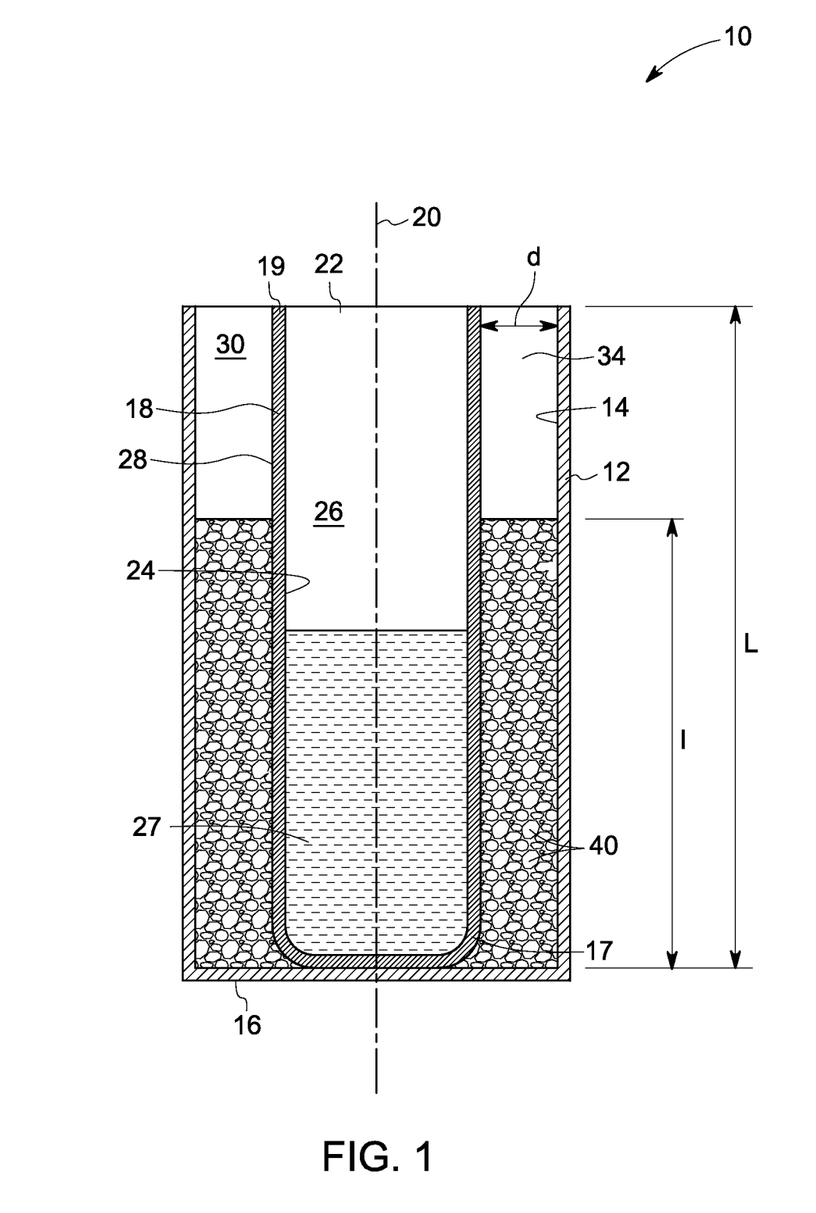
FIG. 1 is a schematic, vertical cross-sectional view of a portion of an electrochemical cell, in accordance with some embodiments of the present disclosure.

FIG. 1 illustrates a schematic of an electrochemical cell 10, according to some embodiments. More particularly, a vertical cross-sectional view of the cell 10 is depicted. The electrochemical cell 10 includes a housing 12 having an interior surface 14 that defines a volume. The housing 12 of the cell may also be referred to as cell casing. The housing 12 of the cell 10 may be sized and shaped to have any suitable cross-sectional profile such as polygonal, elliptical or circular, for example. The housing may be formed from a material including a metal, ceramic, a composite; or combinations thereof. In some embodiments, a suitable metal may include nickel, iron, molybdenum, or an alloy thereof, e.g., steel.

As illustrated, an elongated separator 18 is disposed in the housing volume. The separator 18 usually extends in a substantially vertical direction relative to a base 16 of the housing 12, so as to define an axis 20 of the cell 10. (The particular orientation of the separator, as well as the housing, can vary somewhat). The separator 18 may be cylindrical, tubular, or cup-shaped, with a closed end 17 and an open end 19. The open-end 19 of the separator may be sealable, and defines an aperture 22 for filling the separator 18 with a material during the manufacturing process. In one instance, the aperture 22 may be useful for adding a cathode material. The closed-end 17 of the separator 18 may be pre-sealed, to increase the cell integrity and robustness.

The separator 18 may have any suitable cross-sectional profile such as a circle, oval or ellipse, polygon, cross-shape, star-shape, or cloverleaf shape, for example. In one embodiment, the separator 18 may have a length (along the axis 20) to width (normal to the axis 20) ratio that is greater than about 1:10. In one embodiment, the length to width ratio of the separator is in a range of from about 1:10 to about 1:5, although other relative dimensions are possible, as described in U.S. Patent Publication No. US20120219843A1. Furthermore, the separator 18 may have at least one wall of a selected thickness and a selected ionic conductivity. In some embodiments, the thickness of the separator wall may be less than about 5 millimeters.

With continued reference to FIG. 1, the separator 18 has an inner surface 24 that defines a first compartment 26, and an outer surface 28 that defines a second compartment 30 between the outer surface 28 and the interior surface 14 of the housing 12. The first compartment 26 is in ionic communication with the second compartment 30 through the separator 18. As used herein, the phrase "ionic communication" refers to the traversal of the ions between the first compartment 26 and the second compartment 30, through the separator 18. In some embodiments, the separator 18 is capable of transporting alkali metal ions between the first and the second compartments. Suitable alkali metal ions may include one or more of sodium, lithium and potassium. In specific embodiments, the alkali metal ions include sodium.

In one embodiment, the first compartment 26 includes a positive electrode composition (or cathode material) 27, and is referred to as a cathode or a cathode compartment. In some embodiments, the cathode material 27 includes an electroactive metal, an alkali metal halide, and an electrolyte salt. Suitable examples of the electroactive metals include nickel, iron, copper, zinc, cobalt, chromium, or combinations thereof. In particular embodiments, the electroactive metal includes nickel. A suitable alkali metal halide includes at least one halide of sodium, potassium, or lithium. In some embodiments, the alkali metal halide includes sodium chloride.

The electrolyte salt is generally present in the molten form. The molten electrolyte transports alkali metal ions from the solid separator to the cathode material, and vice-versa. In some embodiments, the molten electrolyte includes an alkali metal halide and aluminum halide. In one embodiment, the molten electrolyte is sodium tetrachloroaluminate ($NaAlCl_4$). In one particular embodiment, the cathode material includes nickel, sodium chloride, and tetrachloroaluminate ($NaAlCl_4$). In some embodiments, the cathode material may further include an additional element such as carbon, sulfur, or a combination thereof. An additive may also be added to improve the performance of the cell, as known in the art. The additive may be added in an amount less than about 5 weight percent. Some examples include sodium iodide, sodium bromide, tungsten carbide, or combinations thereof.

In some embodiments, the second compartment 30 includes a negative electrode composition or anode material (not shown), and is referred to as an anode or an anode compartment. The anode compartment 30 has a volume 32 (i.e., anode compartment volume) that is defined by a length 'L' of the compartment 30 and a gap 34 between the outer surface 28 of the separator 18 and the interior surface 14 of the housing 12. The length 'L' is substantially parallel to the axis 20 of the cell 10. As used herein, the term "substantially parallel" means that the length "L" of the anode compartment 30 extends to a direction that may deviate by an angle less than about 5 degrees to the axis 20.

Typically, the anode compartment 30 is empty in the ground state (uncharged state) of the cell 10. During operation of the cell 10, a portion of the anode compartment volume is filled with an alkali metal (formed by reduction of the alkali metal halide), which move from the cathode compartment 26 to the anode compartment 30 through the separator 18. This alkali metal may also be referred to as the "anode material". The anode compartment 30 may receive and store a reservoir of the anode material, in some embodiments. For example, in a fully charged cell, the anode material fills up to about 50 percent of the anode compartment volume. In one embodiment, the anode material fills from about 40 percent to about 50 percent of the anode compartment volume. Non-limiting examples of the anode material may include lithium, sodium, or potassium. The anode material is usually molten during use. In some particular embodiments, the anode material is molten sodium metal.

In some embodiments, the anode material may further include one or more additives. Additives suitable for use in the anode material may include a metallic oxygen scavenger. Suitable metal oxygen scavengers may include one or more of manganese, vanadium, zirconium, aluminum, or titanium. Other useful additives may include materials that increase wetting of the separator outer surface 28 by the molten anode material.

In some embodiments, the separator 18 is an alkali metal ion conductor solid electrolyte. The separator 18 is capable of transporting alkali metal ions between the first compartment 26 and the second compartment 30. Suitable materials for the solid separator 18 may include an alkali-metal-beta-alumina, alkali-metal-beta"-alumina, alkali-metal-beta'-gallate, or alkali-metal-beta"-gallate. In some embodiments, the solid separator 18 may include a beta-alumina, a beta"-alumina, a gamma alumina, or a micromolecular sieve such as, for example, a borosilicate; a tectosilicate, such as a feldspar, or a feldspathoid. Other exemplary separator materials include zeolites, for example a synthetic zeolite such as zeolite 3A, 4A, 13X, ZSM-5; rare-earth silicophosphates; silicon nitride; or a silicophosphate (NASICON: $Na_3Zr_2Si_2PO_{12}$).

In some embodiments, the separator 18 may be stabilized by the addition of small amounts of a dopant. The dopant may include one or more oxides selected from lithia, magnesia, zinc oxide, and yttria. These stabilizers may be used alone or in combination with themselves, or with other materials. A cation facilitator material may be disposed on at least one surface of the separator, in one embodiment. The cation facilitator material may include, for example, selenium, as discussed in U.S. Patent Publication No. 2010/0086834.

In particular embodiments, the separator includes a beta alumina. In one embodiment, a portion of the separator is alpha alumina, and another portion of the separator is beta alumina. In some embodiments, the alpha alumina portion (a non-ionic-conductor) may help with sealing and/or fabrication of the cell. In a particular embodiment, the separator 18 includes a beta alumina separator electrolyte (BASE), and may further include one or more dopants.

In some embodiments, at least one of the alkali metals in the positive electrode composition may be sodium, and the separator may be beta-alumina. In another embodiment, the alkali metal may be potassium or lithium, with the separator then being selected to be compatible therewith. For example, in embodiments where the ions include potassium, silver, strontium, and barium cations, the separator material may include beta alumina. In certain other embodiments, where lithium cations are used, lithiated borophosphate $BPO_4$—$Li_2O$, may be employed as the separator material.

As noted previously, the cell 10 further includes a conductive matrix 40 disposed in at least a portion of the anode compartment volume 32. The conductive matrix 40 is disposed in the anode compartment volume 32 such that the conductive matrix 40 occupies the gap 34 between the outer surface 28 of the separator 18 and the interior surface 14 of the housing 12, as shown in FIG. 1. As used herein, the term "gap" refers to a horizontal distance or planar area that extends between the outer surface 28 of the separator 18 and the interior surface 14 of the housing 12, and is substantially perpendicular to the axis 20 of the cell 10. The gap 34 may be defined by a width 'd'. In one embodiment, the width 'd' of the gap 34 (i.e., gap width) is at least about 1 millimeter (mm). In one embodiment, the gap 34 may have a gap width 'd' in a range from about 1 mm to about 10 mm. As used herein, the term "substantially perpendicular" means that the gap 34 extends in a direction that may be at an angle ranging from about 85 degrees to about 95 degrees to the axis 20.

Figure 2:
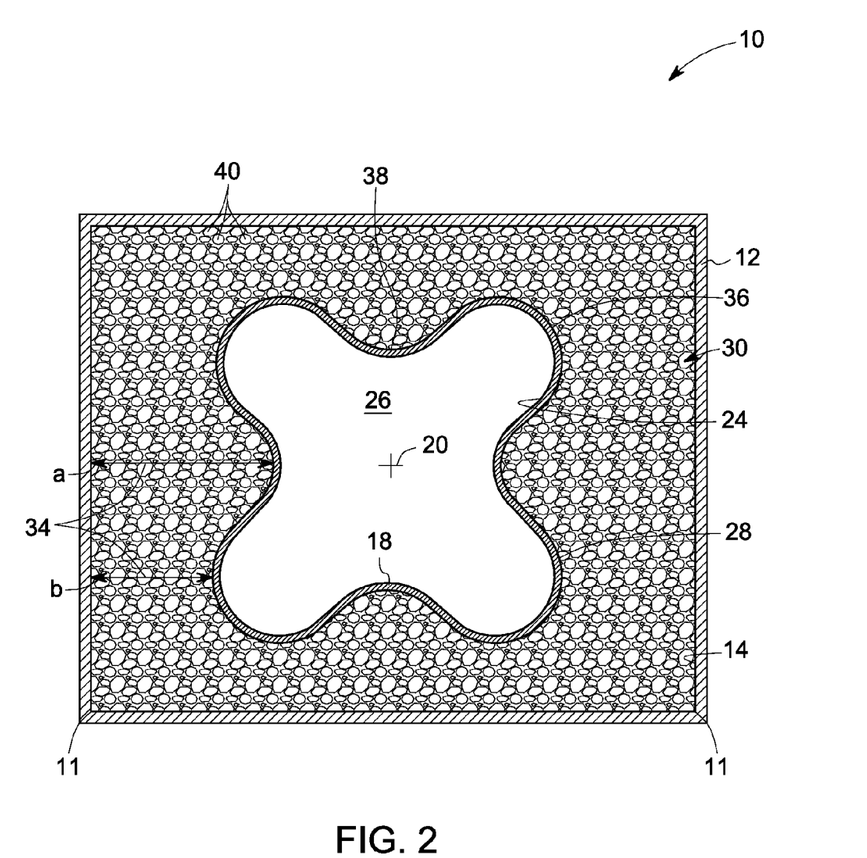
FIG. 2 is a schematic, horizontal cross-sectional view of a portion of the electrochemical cell, in accordance with some embodiments of the present disclosure.

Further, the gap 34 may be of uniform width in some embodiments, or the width may vary around the entire outer surface 28 of the separator 18 depending on the shape and size of the separator 18 and the housing 12. As noted, the separator 18 may have a cross-sectional profile normal to the axis 20. In some embodiments, the separator 18 may have a cross-sectional profile in the shape of a rugate, as depicted in FIG. 2 (described below). Such a shape usually includes a plurality of concave sections and convex sections (also referred to as "lobe portions" and "valley portions"), in an alternate fashion. The rugate, which may provide a cloverleaf shape, may increase the overall available surface area of the separator for a given volume.

FIG. 2 illustrates a horizontal (normal to the axis 20) cross-sectional view of the cell 10, in some embodiments. As depicted, the separator 18 has a cross-sectional profile of cloverleaf shape having four lobe portions 36 and four corresponding valley portions 38. The separator 18 may be located axially symmetric to the housing 12, with each lobe portion 36 of the separator being aligned with, and projecting towards, one of the corner regions 11 of the housing 12. In some embodiments, the number of lobe portions 36 of the separator corresponds to the number of peripherally spaced, corner regions 11 of the housing 12. As shown in FIG. 2, a pair of lobe portions 36 defines the valley portion 38 that spans a bigger gap 34 (of width 'a') between an interior surface 14 of the housing 12 and the outer surface 28 of the separator 18 as compared to that of the gap 34 (of width 'b') defined by one of the lobe portions 36. Thus in FIG. 2, the width "a" of the gap 34 at a particular location is greater than the width "b" of the gap 34 at another location. Further, as can be seen from the FIG. 2, in such a separator profile, the gap width may vary from location to location. Therefore, in some embodiments, the gap 34 (that is the width) may vary around the entire outer surface 28 of the separator 18.

Figure 4:
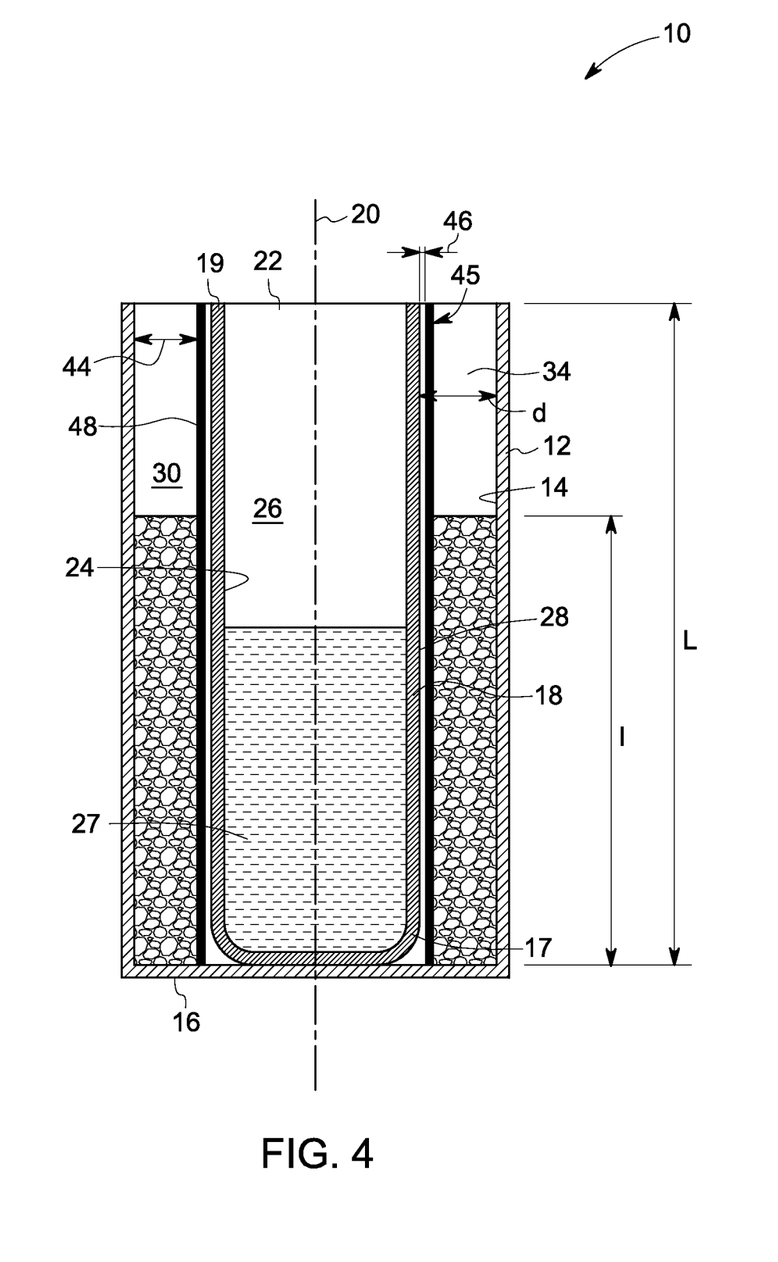
FIG. 4 is a schematic, vertical cross-sectional view of a portion of an electrochemical cell, in accordance with some other embodiments of the present disclosure.
Figure 5:
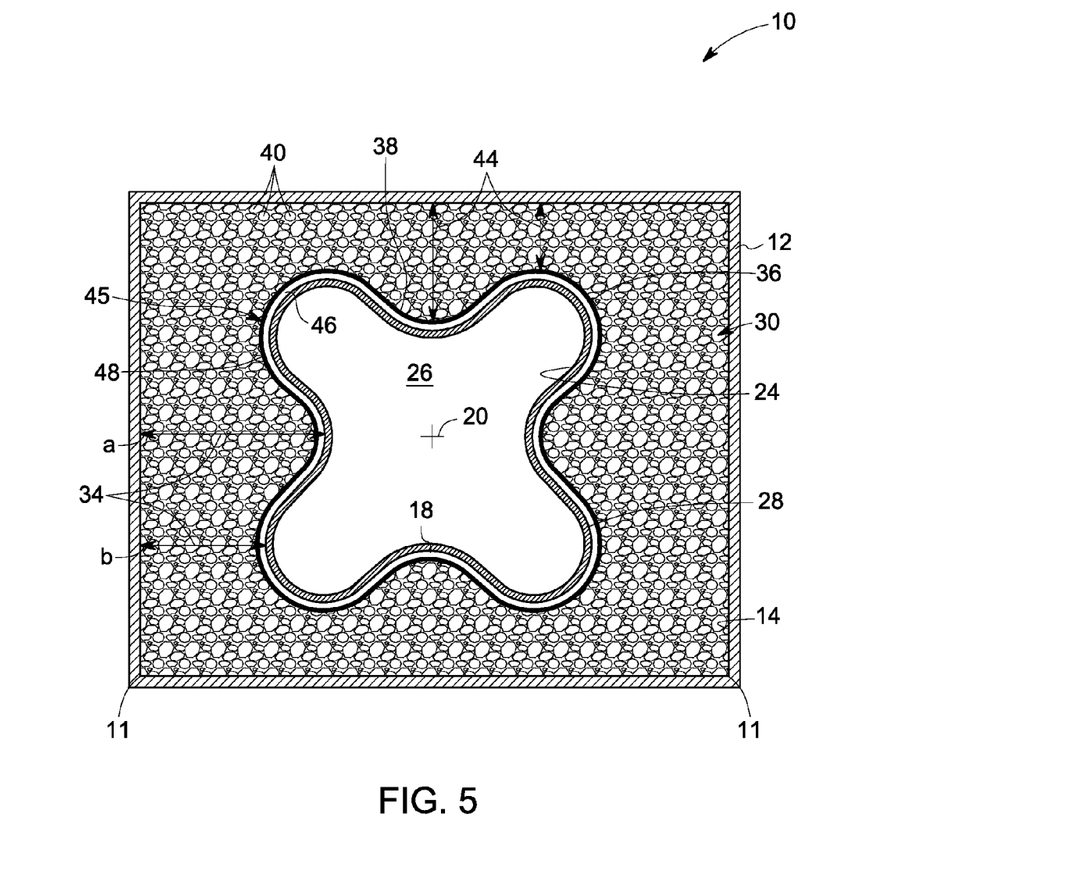
FIG. 5 is a schematic, horizontal cross-sectional view of a portion of an electrochemical cell, in accordance with yet some other embodiments of the present disclosure.
Figure 6:
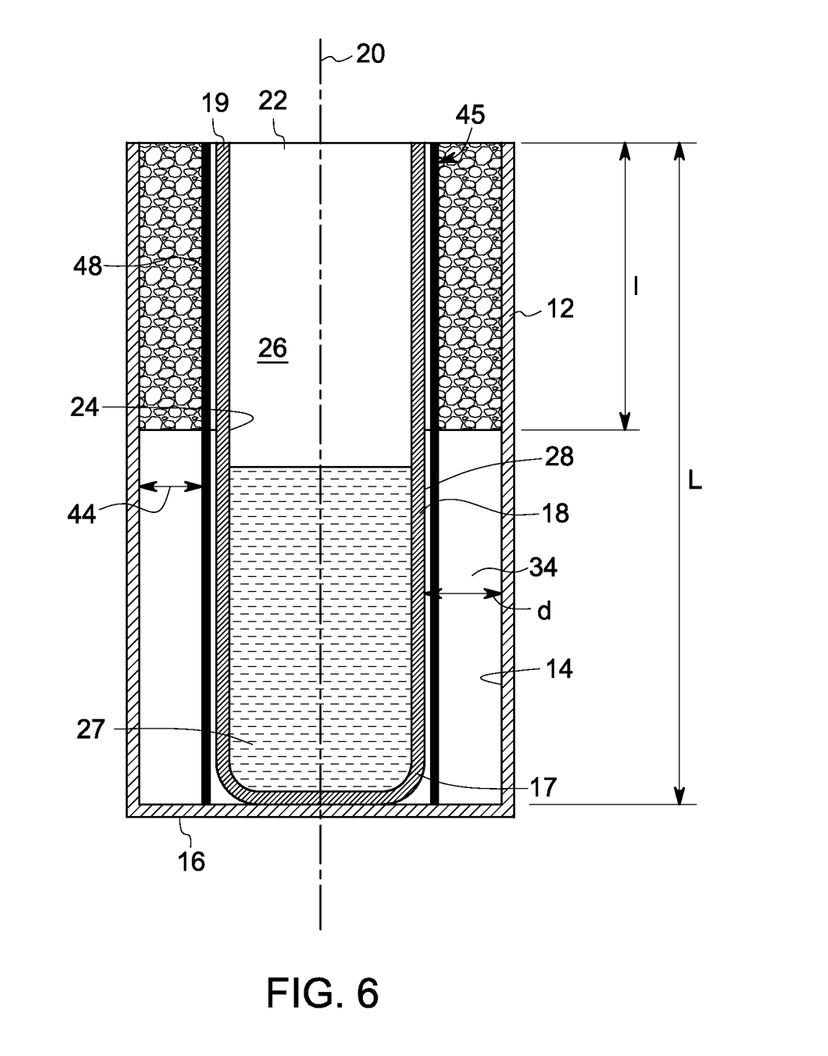
FIG. 6 is a schematic, vertical cross-sectional view of a portion of the electrochemical cell, in accordance with yet some other embodiments of the present disclosure.

The gap 34 is completely occupied by the conductive matrix 40. The term "occupies the gap" as used herein means that the conductive matrix occupies more than about 90 percent portion of the gap width. In some embodiments, a portion of more than about 95 percent of the gap width is occupied by the conductive matrix. With continued reference to FIGS. 1 and 2, in the embodiments illustrated herein, the conductive matrix 40 is in direct contact with the outer surface 28 of the separator 18 and the interior surface 14 of the housing 12 in a continuous manner. In other words, the conductive matrix 40 is continuously in direct contact with the outer surface 28 around the entire periphery of the separator 18. In some other embodiments (described later) wherein a conductive thin sheet 45 is placed between the separator 18 and the housing 12, the conductive matrix 40 occupies the gap 34 such that the conductive matrix 40 is in is in direct contact with the outer surface 48 of the conductive thin sheet 45 and the interior surface 14 of the housing 12 in a continuous manner (FIGS. 4-6).

In some embodiments, the conductive matrix 40 includes a thermally and electrically conductive material that is compatible with the anode material of cell 10. In some embodiments, the material is chemically and electrochemically inert in the anode environment. In some embodiments, the conductive matrix 40 includes a metal having a melting temperature greater than a melting temperature of the anode material 32. Suitable metals include, but are not limited to, copper, iron, nickel, zinc, tin, or aluminum. In some embodiments, the conductive matrix includes a composite or alloy containing the aforementioned metals thereof. In some embodiment, the conductive matrix includes an iron alloy such as FeCrAlY. Other suitable iron alloys include steel or Kovar® alloys. In some embodiments, the conductive matrix includes a copper alloy, such as brass or bronze. In some embodiments, the conductive matrix includes carbon.

In some embodiments, the conductive matrix 40 is present in a porous form. Non-limiting examples of suitable porous forms include foam, fibers, wires, particles, wool, interconnected strips, or particle agglomerates. The porosity of a porous medium refers to the fraction of void space (e.g., pores) in the material, where the void space may contain, for example, air. The remaining fraction of the porous medium is occupied by the solid material. In some embodiments, the porous conductive matrix 40 provides void space that may at least partially be occupied by the anode material in the anode compartment 30. Therefore, the void space of the porous conductive matrix 40 contributes to the empty space of the anode compartment volume 30, which is available for the anode material to fill.

In one embodiment, the conductive matrix 40 has a porosity of at least about 20 percent i.e., the matrix 40 has at least about 20 percent void space. In some embodiments, the porosity of the conductive matrix 40 ranges from about 20 percent to about 90 percent. In a particular embodiment, the porosity of the conductive matrix 40 is in a range from about 50 percent to about 80 percent. In one embodiment, the conductive matrix 40 includes a metallic foam or wool, for example, aluminum foam, copper wool and the likes. The metallic foam or wool usually has a minimum porosity of about 50 percent and a density of 1.2 grams per cubic centimeter.

As used herein, the term "occupy" is used with respect to an area or a volume occupied by a material or an article (for example, the conductive matrix 40) including its void space. A volume or a portion of a volume occupied by the conductive matrix is the total volume of the conductive matrix including void space. The term, "fill", as used herein, is used in context of a volume or a portion of a volume occupied by the solid material of a material or an article (for example, the conductive matrix 40), i.e., by excluding void space of the conductive matrix. A volume or a portion of a volume filled by the conductive matrix is the total volume of the solid material of the conductive matrix excluding void space.

The conductive matrix 40 may be disposed in the anode compartment 30 along the length 'L' of the anode compartment 30 to occupy at least a portion of the anode compartment volume 32. The anode compartment 30 may be occupied by the conductive matrix 40 to at least a fraction 'l' of the length 'L' (FIG. 1). In some embodiments, the portion of the anode compartment volume 32 occupied by the conductive matrix 40 extends to at least about 50 percent of the length 'L' of the anode compartment 30. In some embodiments, the full length 'L' of the anode compartment 30 is occupied by the conductive matrix 40. In some embodiments, the length 'l' extends from about 60 percent to about 90 percent of the length 'L.'

When the conductive matrix 40 is disposed to at least a fraction of the length i.e., "l" of the anode compartment, the conductive matrix 40 fills a proportion of the anode compartment volume 32. The term "proportion of the anode compartment volume filled" refers to a quantitative proportion of the anode compartment volume occupied by the solid material of the conductive matrix 40. As mentioned previously, the void space of the conductive matrix 40 contributes to the empty space or empty proportion of the anode compartment volume.

As alluded to previously, the anode material may fill up to about 50 percent of the anode compartment volume 32 when the cell is fully charged. Therefore, depending on the porosity of the conductive matrix 40 and the empty space required for the anode material to fill a portion of the anode compartment volume 32, the conductive matrix 40 may be disposed up to at least the fraction of the length i.e., 'l' to fill at least about 10 percent of the anode compartment volume 32. In some embodiments, the conductive matrix 40 fills from about 10 percent to about 80 percent of the anode compartment volume 32. In some particular embodiments, the conductive matrix 40 fills from about 20 percent to about 50 percent of the anode compartment volume 32.

As will be appreciated by one of ordinary skill in the art, when a porous material is disposed in a particular volume of a compartment or container to occupy the volume, it fills relatively lesser volume of the compartment or the container based on the porosity of the porous material. In some example embodiments, when a conductive matrix (e.g., metallic foam or wool) having porosity of about 80 percent is disposed in the anode compartment 30, it may be disposed up to the full length 'L' of the anode compartment 30, thereby providing about 80 percent void space for the anode material to fill. In some other example embodiments, when a conductive matrix has a porosity less than about 50 percent, it would provide less than 50 percent void space in the anode compartment volume 32 if the full length 'L' of the anode compartment 30 is occupied by the conductive matrix 40. In some embodiments, the conductive matrix 40 is disposed in the anode compartment 30 such that it occupies between about 50 percent to about 80 percent of the length 'L' to provide more than 50 percent empty space.

In some embodiments, the conductive matrix 40 is disposed in the anode compartment 30 such that the conductive matrix 40 extends up to the full length 'L' of the compartment 30 and fills at least about 10 percent volume of the anode compartment 30. In some other embodiments, the conductive matrix 40 is disposed in the anode compartment 30 such that the conductive matrix 40 extends to a fraction of the length L (i.e., 'l of the compartment') and fills at least about 10 percent of the anode compartment volume 32.

Figure 3:
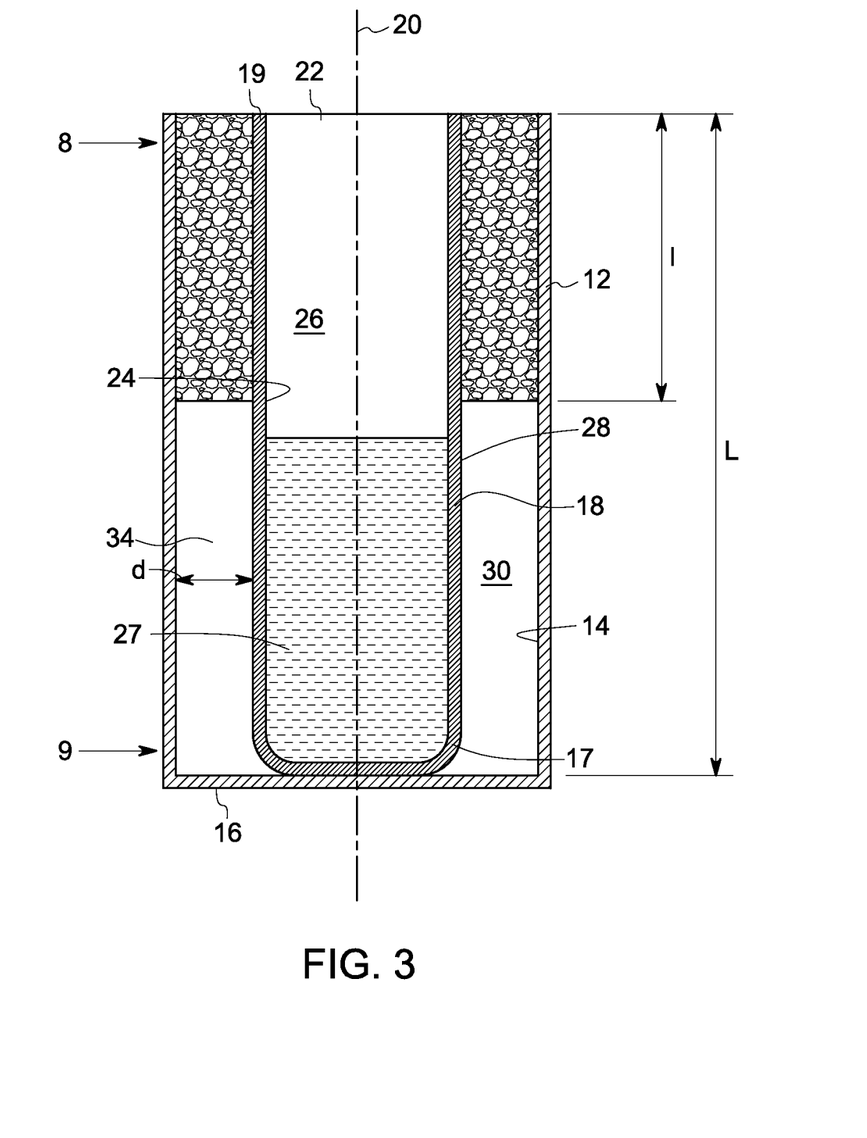
FIG. 3 is a schematic, vertical cross-sectional view of a portion of an electrochemical cell, in accordance with some embodiments of the present disclosure.

In some embodiments, the conductive matrix 40 is disposed in an upper portion 8 of the cell 10, as illustrated in FIG. 3. In some embodiments, a bottom portion 9 of the cell 10 is free of the conductive matrix 40. As used herein, the term "upper portion" refers to a portion of the anode compartment 30 that is measured from the top of the cell 10 along the axis 20 of the cell, and the term "bottom portion" of the anode compartment 30 refers to a portion that is measured from the base 16 along the axis 20 of the cell. The arrangement of the conductive matrix 40 as depicted in FIG. 3 provides the thermal and electrical connectivity while keeping the bottom portion available for the anode material to fill during operation of the cell.

As discussed previously, the heat generated in the core i.e., the cathode compartment 26 of the cell 10, travels in a path (not shown) extending from the cathode material 26, through the separator 18, through the anode compartment 30 (including the conductive matrix 40) and to the housing 12. The conductive matrix 40, as described in some embodiments of the present disclosure, facilitates the thermal and electrical transfer between the cathode compartment 26 and the housing 12. Thus, the electrochemical cell 10 can be operated at its optimal temperature by removing any excess heat produced during discharge, out of the cell 10, and maintaining a desired temperature of the housing 12 and the cathode compartment 26. In some embodiments, the conductive matrix 40 facilitates at least a rapid or uniform transfer of heat from the cathode compartment 26 to the housing 12 such that the difference in temperature between the cathode compartment 26 and the housing 12 is maintained within a range of temperatures, for example, up to about 50 degrees range.

Some embodiments presented herein may facilitate an increased contact area between the anode material and the separator 18. A discharge power of the electrochemical cell 10 is dependent upon the contact area between the anode material and the separator 18. An increased contact area increases the amount of power that is produced by cell 10.

FIGS. 4-6 illustrate a cell 10 in a similar manner and structure as illustrated in FIGS. 1-3, with an addition of a conductive thin sheet 45. As illustrated in FIGS. 4-6, the conductive thin sheet 45 is disposed in the second compartment 30. The conductive thin sheet 45 is disposed in close proximity to the separator 18 such that the conductive thin sheet 45 substantially conforms to the shape of the outer surface 28 of the separator 18. The conductive thin sheet 45 may extend to the full length (or height) of the separator 18, although this is not always necessary. In some embodiments, the shape and profile of the conductive thin sheet is such that it usually fits the general shape and contour of the separator 18, providing a channel 46 between the conductive thin sheet 45 and the outer surface 28 of the separator 18 for wicking of the anode material. The channel 46 provides a capillary action that facilitates transport of anode material along the separator 18 and increases the contact area of anode material with the separator 18. In some embodiments, the conductive thin sheet 45 is wrapped around the separator 18 such that the channel 46 between conductive thin sheet 45 and the outer surface 28 of the separator 18 is approximately equal to, or less than about 0.5 mm.

In some embodiments, the conductive thin sheet 45 facilitates a uniform distribution and contact of the anode material over the outer surface 28 of the separator 18. The increased contact area facilitates an increase in charge transfer in initial stages of a charging process of the cell 10, when little or no anode material is present in the anode compartment 30. For example, even a small amount of the anode material present in the anode compartment 30 is transported up along the outer surface 28 of the separator 18 through the channel 46 between the conductive thin sheet 45 and the separator 18 during the initial stages of charging.

In some embodiments, the cell 10 includes more than one conductive thin sheet (not shown) arranged in close proximity to the separator 18 conforming to the shape of the separator, for example one conductive thin sheet wrapped around each lobe portion and valley portion of the separator 18 (FIG. 5). Various details of the shape, size, features, and functions of the conductive thin sheet disposed in an electrochemical cell are described in U.S. Patent Publication No. 2010/0178546A1.

With continued reference to FIGS. 4-6, the conductive matrix 40 is disposed in the anode compartment 30 to occupy a gap 44 such that the matrix 40 is in direct contact with an outer surface 48 of the conductive thin sheet 45 and the interior surface 14 of the housing 12 in a continuous manner i.e., continuously in direct contact with the conductive thin sheet 45 around the entire periphery of the conductive thin sheet 45. In such embodiments, the gap 44 occupied by the conductive matrix 40 is defined between the conductive thin sheet 45 and the housing 12.

The thickness of the conductive thin sheet 45 can vary, but is usually in a range from about 0.01 millimeter to about 1 millimeter. In some embodiments, the thickness ranges from about 0.05 millimeter to about 0.5 millimeter. In some specific embodiments, the thickness ranges from about 0.1 millimeter to about 0.2 millimeter.

The conductive thin sheet 45 may be made of a thermally and electrically conductive material that is the same as, or different from, the material of the conductive matrix 40. In one embodiment, the conductive thin sheet 45 includes a metal. In one embodiment, the conductive thin sheet 45 is a metal foil. Suitable metals for the conductive thin sheet 45 include, but are not limited to, nickel, copper, iron, aluminum or an alloy of aforementioned metals. A suitable example includes steel.

Referring again to FIGS. 1-6, in some embodiments, at least one of the first compartment 26 and the second compartment 30 may include a current collector (not shown), to collect the current produced by the electrochemical cell 10.

In some embodiments, at least one of the conductive thin sheet 45 and the housing 12 collects the current in the anode compartment 30, thereby functioning as a current collector.

Another embodiment of the invention is directed to an energy storage battery. In some embodiments, a plurality of the electrochemical cells, as described herein, may be organized into an energy storage system, for example, a battery. Multiple cells may be electrically connected in series or parallel, or in a combination of series and parallel. For convenience, a group of coupled cells may be referred to as a module or pack. The ratings for the power and energy of the battery pack may depend on such factors as the number of cells, and the connection topology in the pack. Other factors may be based on end-use application specific criteria. The battery pack further includes a cooling assembly, as known in the art. In one embodiment, the battery pack includes cooling fins disposed between one or more rows of the electrochemical cells. A cooling medium to the cooling fins can be provided by using a common supply.

Apart from certain exceptions detailed herein, the components of the electrochemical cell may, in general, be prepared of materials, and using techniques, generally known in the art that allow the electrochemical cell to function according to the present disclosure.

EXAMPLES

The examples presented below are intended to be merely illustrative, and should not be construed to be any sort of limitation on the scope of the claimed invention.

Five electrochemical cells similar to that of FIG. 1 or FIG. 4 were assembled, and reference to the figure (cell 10) will be made here, to aid in this description. Three comparative cells (A, B, and C) were assembled according to known methods and materials without a conductive matrix in the anode compartment 30. The remaining two experimental cells (D and E) were assembled in a manner similar to the comparative cells except a thin nickel sheet (of thickness 0.001 inch) and a copper wool (25 grams) were disposed in the anode compartment 30 (the volume of the anode compartment was equivalent to about 75 Ampere-hours of sodium) of the experimental cells (FIG. 4). The copper wool was disposed extending to about full length of the anode compartment. All cells were assembled in a discharge state.

Testing of Cells

Cell testing was carried out, according to a standard protocol described in the referenced U.S. Patent Publication No. US20120219843A1, using a 100 A, 10V, multi-channel Digatron BTS600 battery testing system. The testing protocol involved a series of charging and discharging cycles, with a corresponding regimen of current, voltage, and temperature adjustments (approximately 225 cycles in all).

The following protocol was representative of different duty cycles
1. Starting at 80 mA and ramping up to 5.5 A over time, charge to 2.67V, then at 2.67V to a current of 500 mA, while at 330° C.
2. Reduce temperature to 300° C. and discharge at −16 A to 1.8V or 32 Ah.
3. Charge at 10 A to 2.67V, then at 2.67V down to 500 mA.
4. Discharge at −16 A to 1.8V or 32 Ah.
5. Repeat steps 3 and 4 for a total of 10 cycles.
6. Charge at 15 A to 2.67V, then at 2.67V to a current of 500 mA.
7. Discharge at −60 W to 22 Ah or 1.8V.
8. Charge at 15 A to 2.67V, then at 2.67V to a current of 500 mA.
9. Discharge at −120 W to 1.8V.
10. Charge at 15 A to 2.67V, then at 2.67V to a current of 500 mA.
11. Discharge at −130 W to 22 Ah or 1.8V.
12. Charge at 15 A to 2.67V, then at 2.67V to a current of 500 mA.
13. Discharge at −140 W to 22 Ah or 1.8V.
14. Charge at 15 A to 2.67V, then at 2.67V to a current of 500 mA.
15. Discharge at −155 W to 22 Ah or 1.8V.
16. Charge at 15 A to 2.67V, then at 2.67V to a current of 500 mA.
17. Discharge at −110 W to 1.8V or 15 min, then at 1.8V to 15 min
18. Repeat steps 16 and 17 100 times.
19. Go to step 6 to repeat steps 6-18 once, for a total of 225 cycles.

Figure 7:
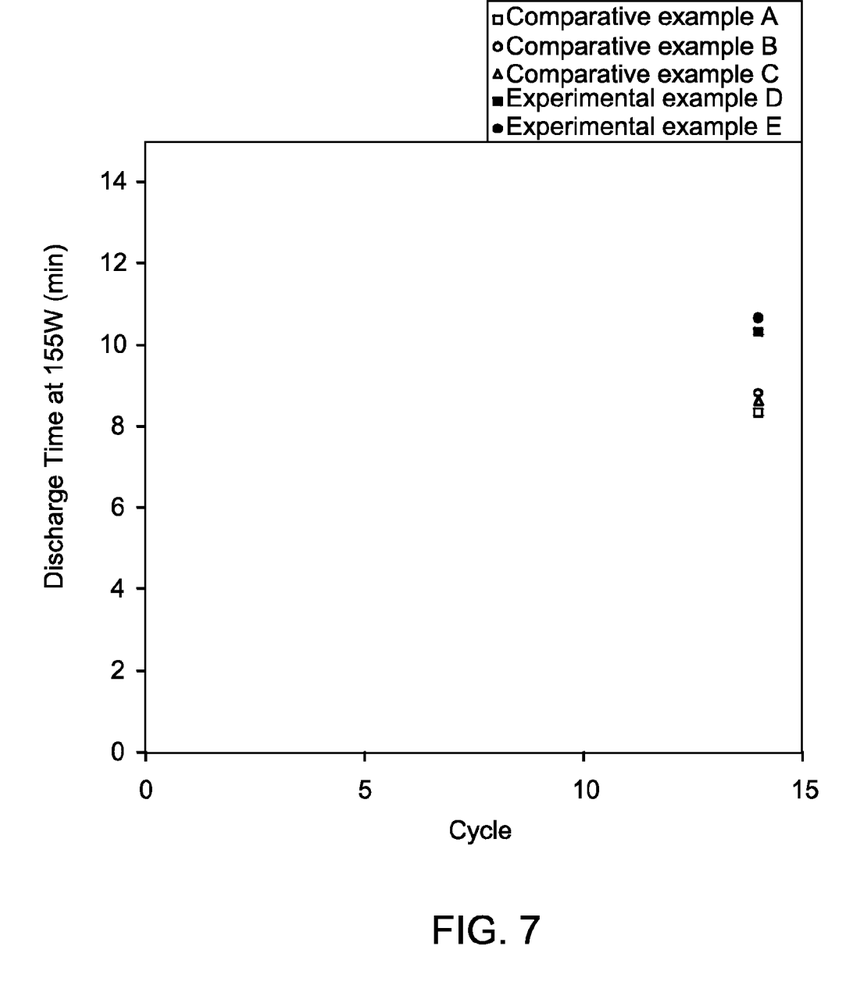
FIG. 7 is a plot showing discharge time versus cycle number at 155 W power output.

FIG. 7 is a plot showing a comparison of discharge time at 155 watts of comparative electrochemical cells A, B and C (not including a conductive matrix) and the experimental electrochemical cells D and E (including a thin steel sheet and copper wool). As shown in FIG. 7, experimental cells D and E incorporating a conductive matrix sustained a longer discharge time at a power of 155 W when compared to the comparative electrochemical cells A, B and C.

The term "cycle", as used herein, refers to number of charge/discharge cycles of an electrochemical cell being fully charged and then undergoing a discharge for a predetermined time.

Figure 8:
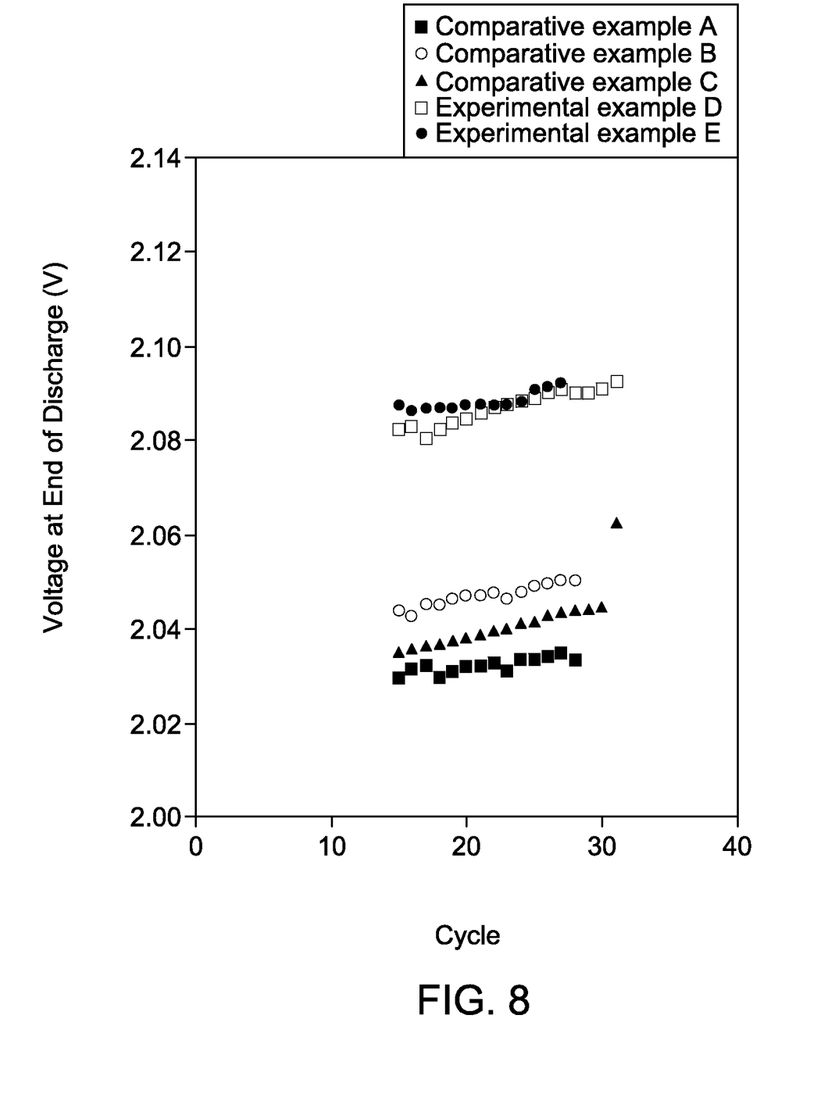
FIG. 8 is a plot showing cell voltage at the end of a 15 minute discharge at various cycles.

FIG. 8 plots the voltage at the end of multiple 15 minute discharge cycles at a discharge power of 110 W for comparative cells A, B and C, and experimental cells D and E. Experimental cells D and E (including a thin steel sheet and copper wool) showed increased voltage at the end of each discharge cycle when compared to comparative cells A, B and C.

Figure 9:
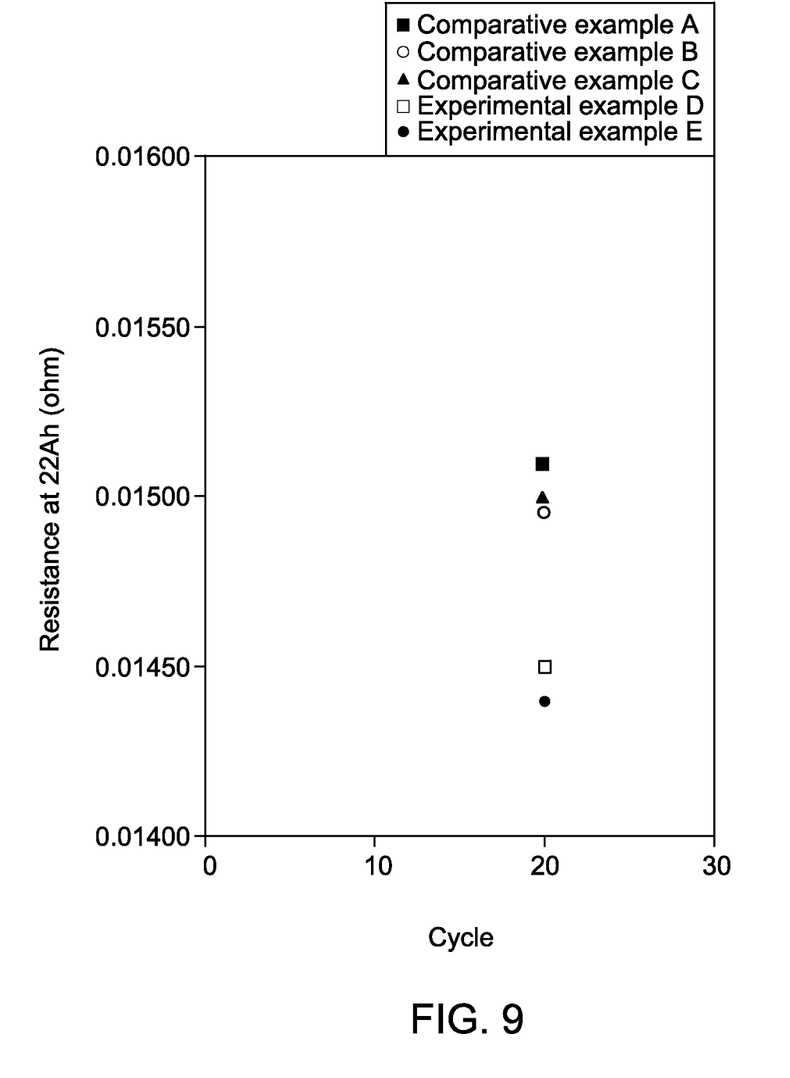
FIG. 9 is a plot showing cell resistance measured at 22 Ah at a particular discharge cycle.

FIG. 9 plots the resistance at a discharge of 22 Ah at the 10th discharge cycle for comparative cells A, B and C, and experimental cells D and E. Experimental cells D and E (including a thin steel sheet and copper wool) showed reduced resistance when compared to comparative cells A, B and C.

Figure 10:
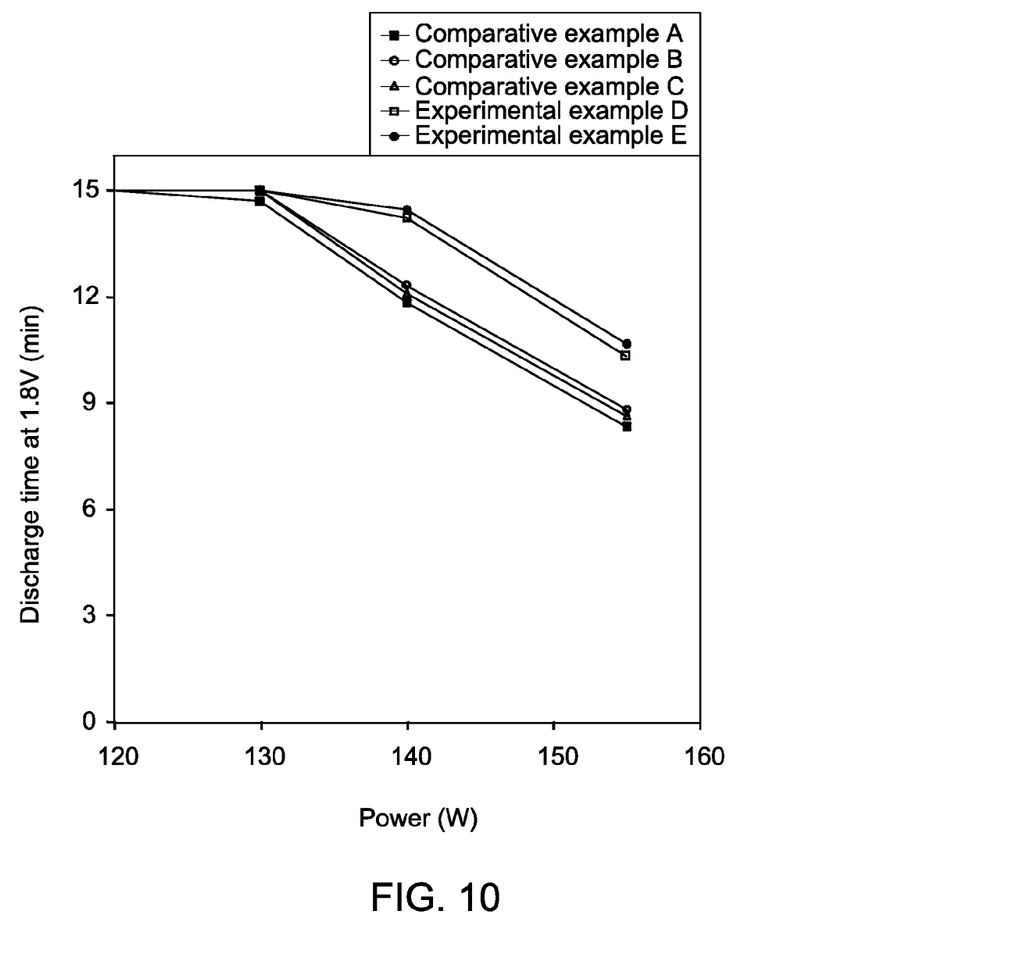
FIG. 10 is a plot showing discharge time from full charge to 1.8V at various output powers.

FIG. 10 shows a plot of discharge time from full charge to 1.8V at a sampling of different power outputs for comparative cells A, B and C, and experimental cells D and E. Experimental cells D and (including a thin steel sheet and copper wool) showed increased discharge time for power levels over 130 W, when compared to comparative cells A, B and C.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An electrochemical cell, comprising:
 a housing having an interior surface defining a volume;
 an elongated separator disposed in the housing volume and defining an axis of the cell, the separator having an inner surface and an outer surface, the inner surface of the separator defining a first compartment, the outer surface of the separator and the interior surface of the housing defining a second compartment having a volume; and a conductive matrix disposed in at least a portion of the second compartment volume such that the conductive matrix occupies a gap between the outer surface of the separator and the interior surface of the housing, wherein the gap extends in a direction substantially perpendicular to the axis of the electrochemical cell, and wherein the conductive matrix is in direct contact with the interior surface of the housing in a continuous manner around an entire periphery of the separator.

2. The electrochemical cell of claim 1, wherein the second compartment is further defined by a length substantially parallel to the axis of the cell, and the portion of the second compartment volume occupied by the conductive matrix extends to at least about 50 percent of the length.

3. The electrochemical cell of claim 2, wherein the portion of the second compartment volume occupied by the conductive matrix extends to from about 60 percent to about 100 percent of the length.

4. The electrochemical cell of claim 1, wherein the conductive matrix comprises a thermally and electrically conductive material.

5. The electrochemical cell of claim 1, wherein the conductive matrix has a porosity of at least about 20 percent.

6. The electrochemical cell of claim 5, wherein the porosity of the conductive matrix is in a range from about 50 percent to about 80 percent.

7. The electrochemical cell of claim 1, wherein the conductive matrix is in the form of foam, wool, fibers, wires, particles, particle agglomerates, or combinations thereof.

8. The electrochemical cell of claim 1, wherein the conductive matrix comprises a metallic wool.

9. The electrochemical cell of claim 1, wherein a width of the gap is in a range from about 1 millimeter to about 10 millimeters, and the width of the gap is completely occupied by the conductive matrix.

10. The electrochemical cell of claim 1, wherein the separator has at least one concave section and at least one convex section, the concave and convex sections are facing the interior surface of the housing.

11. The electrochemical cell of claim 10, wherein a width of the gap varies along the outer surface of the separator.

12. The electrochemical cell of claim 1, wherein the conductive matrix is disposed in the portion of the second compartment volume such that conductive matrix is further in direct contact with the outer surface of the separator in a substantially continuous manner around the entire periphery of the separator.

13. The electrochemical cell of claim 1, further comprising a conductive thin sheet disposed in the second compartment, wherein the conductive thin sheet substantially conforms to a shape defined by the outer surface of the separator such that a channel is formed between the conductive thin sheet and the outer surface of the separator.

14. The electrochemical cell of claim 13, wherein the channel has a dimension less than about 0.5 millimeter.

15. The electrochemical cell of claim 13, wherein the conductive thin sheet is a metal foil.

16. The electrochemical cell of claim 13, wherein the conductive matrix is disposed in the portion of the second compartment volume such that the conductive matrix is further in direct contact with an outer surface of the conductive thin sheet in a substantially continuous manner around the entire periphery of the separator.

17. The electrochemical cell of claim 1, wherein the conductive matrix fills from about 10 percent to about 80 percent volume of the second compartment volume.

18. The electrochemical cell of claim 1, further comprising an anode material disposed in the second compartment volume, wherein the anode material comprises an alkali metal selected from the group consisting of lithium, sodium, and potassium.

19. The electrochemical cell of claim 1, wherein the first compartment comprises a cathode material comprising an alkali metal halide.

20. An electrochemical cell, comprising:
a housing having an interior surface defining a volume;
an elongated separator disposed in the volume, defining an axis of the cell, the separator having an inner surface and an outer surface; the inner surface defining a first compartment comprising a cathode material; and the outer surface of the separator and the interior surface of the housing defining a second compartment having a volume,
a conductive thin sheet disposed in the second compartment, wherein the conductive thin sheet substantially conforms to a shape defined by the outer surface of the separator such that a channel is formed between the conductive thin sheet and the outer surface of the separator; and
a conductive matrix disposed in a portion of the second compartment volume such that the conductive matrix occupies a gap between an outer surface of the conductive thin sheet and the interior surface of the housing, wherein the gap extends in a direction substantially perpendicular to the axis of the electrochemical cell, and the conductive matrix is in direct contact with both the outer surface of the conductive thin sheet and the interior surface of the housing in a substantially continuous manner around an entire periphery of the separator.

* * * * *